(12) United States Patent
Nakadate

(10) Patent No.: US 8,847,492 B2
(45) Date of Patent: Sep. 30, 2014

(54) LIGHTING CONTROL DEVICE FOR VEHICLE HEADLAMP, AND VEHICLE HEADLAMP SYSTEM

(75) Inventor: Koichi Nakadate, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 131 days.

(21) Appl. No.: 13/589,563

(22) Filed: Aug. 20, 2012

(65) Prior Publication Data
US 2013/0049587 A1    Feb. 28, 2013

(30) Foreign Application Priority Data
Aug. 26, 2011    (JP) .................................. 2011-184854

(51) Int. Cl.
*B60Q 1/08* (2006.01)
*B60Q 1/00* (2006.01)
*B60Q 1/14* (2006.01)

(52) U.S. Cl.
CPC ............ *B60Q 1/08* (2013.01); *B60Q 2300/322* (2013.01); *B60Q 2300/056* (2013.01); *B60Q 1/143* (2013.01); *B60Q 2300/112* (2013.01); *B60Q 2300/42* (2013.01)
USPC .............................. 315/82; 362/276; 362/465

(58) Field of Classification Search
CPC ... G60Q 1/08; G60Q 1/143; G60Q 2300/056; G60Q 2300/112; G60Q 2300/322; G60Q 2300/42
USPC .......... 315/82; 250/208.1; 362/466, 276, 465; 340/988
See application file for complete search history.

(56) References Cited

U.S. PATENT DOCUMENTS

| | | | |
|---|---|---|---|
| 5,796,094 A * | 8/1998 | Schofield et al. | 250/208.1 |
| 2002/0080618 A1 * | 6/2002 | Kobayashi et al. | 362/466 |
| 2012/0002056 A1 * | 1/2012 | Nam et al. | 348/169 |

FOREIGN PATENT DOCUMENTS

| | | |
|---|---|---|
| JP | 2009-227088 A | 10/2009 |
| JP | 2009-298344 A | 12/2009 |
| JP | 2010-232081 A | 10/2010 |

* cited by examiner

*Primary Examiner* — Daniel D Chang
(74) *Attorney, Agent, or Firm* — Holtz Holtz Goodman & Chick PC

(57) ABSTRACT

A lighting control device for a headlamp of a vehicle includes a light-blocking range setting unit that sets a light-blocking range in a light distribution pattern in accordance with a position of a target vehicle that is present ahead of the vehicle, based on an image acquired by capturing a front view from the vehicle by a camera, and a moving direction detection unit that detects a moving direction of the target vehicle in a horizontal direction based on the image. In addition, a light-blocking range correction unit corrects the light-blocking range based on the moving direction detected by the moving direction detection unit, wherein the light-blocking range correction unit corrects the light-blocking range so that at least a moving direction side of the light-blocking range is expanded, and a headlamp control unit that drives the headlamp based on the light-blocking range corrected by the light-blocking range correction unit.

5 Claims, 8 Drawing Sheets

F I G. 4 A
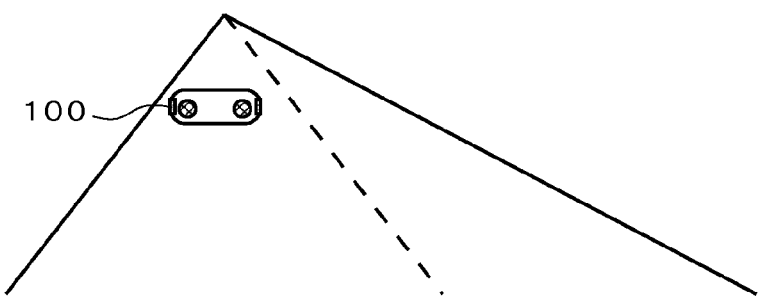
F I G. 4 B
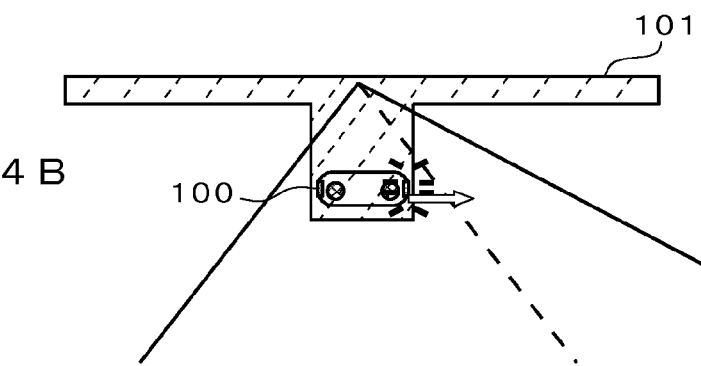
F I G. 4 C
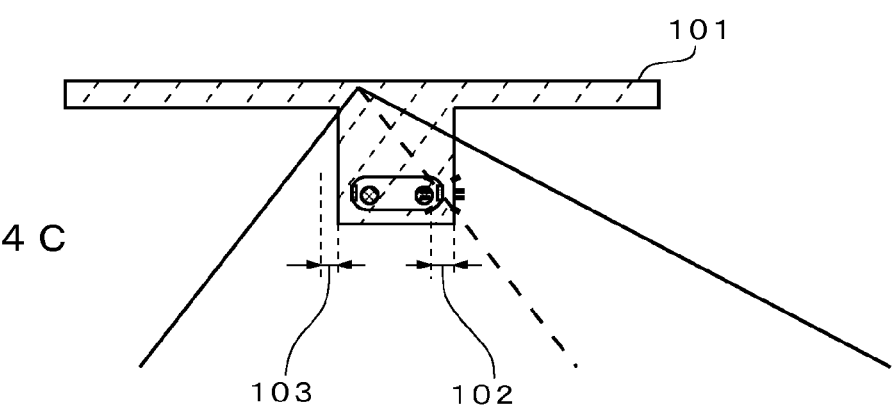

FIG. 7A
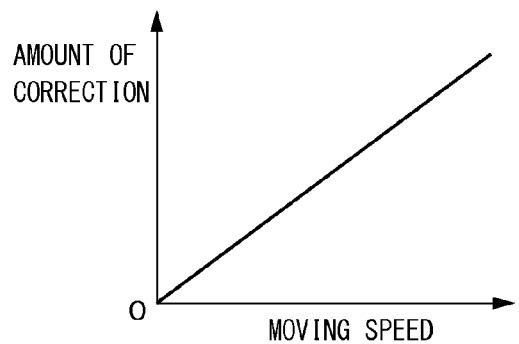
FIG. 7B
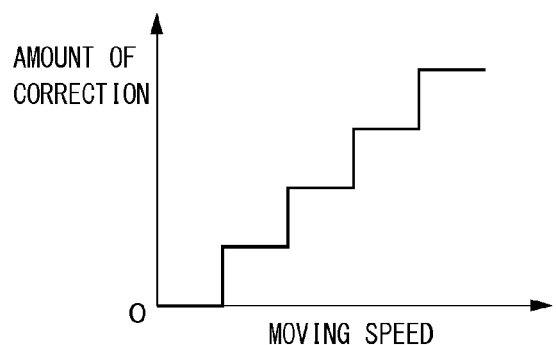
FIG. 7C
| MOVING SPEED | ~v1 | ~v2 | ~v3 | ~v4 | ~v5 |
|---|---|---|---|---|---|
| AMOUNT OF CORRECTION | 0 | $\alpha 1$ | $\alpha 2$ | $\alpha 3$ | $\alpha 4$ |
| | 0 | $\beta 1$ | $\beta 2$ | $\beta 3$ | $\beta 4$ |

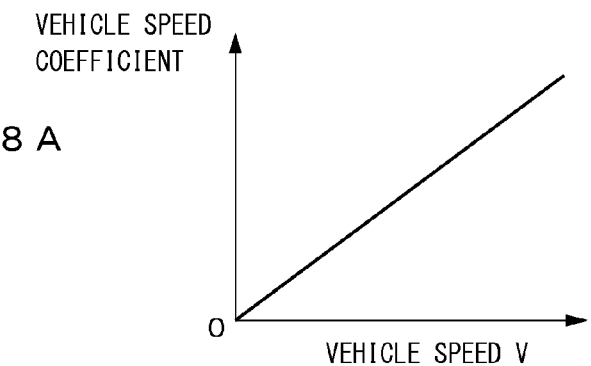
FIG. 8A
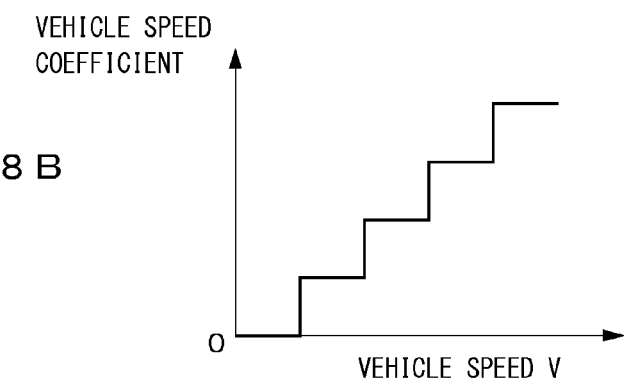
FIG. 8B
FIG. 8C
| VEHICLE SPEED | ~V1 | ~V2 | ~V3 | ~V4 | ~V5 |
|---|---|---|---|---|---|
| VEHICLE SPEED COEFFICIENT | 0 | F1 | F2 | F3 | F4 |

LIGHTING CONTROL DEVICE FOR VEHICLE HEADLAMP, AND VEHICLE HEADLAMP SYSTEM

BACKGROUND OF THE INVENTION

1. Field of the Invention

The present invention relates to a technology for controlling an illumination state by headlamps of a vehicle.

2. Description of the Related Art

When driving a vehicle at night, a driver checks ahead of the vehicle basically by illuminating a road by headlamp on low beams, and by, if necessary, illuminating the road by high beams. However, when light is radiated above what is commonly referred to as a cut-off line, this may cause a glare to oncoming vehicles and leading vehicles (hereinafter these will be referred to as "front vehicles"). Consequently, in recent years, various technologies have been proposed to prevent glare by detecting positions of front vehicles and controlling a radiation pattern of high beams not to radiate light in positions where front vehicles are present. For example, Japanese Unexamined Patent Application Publication No. 2010-232081 and Japanese Unexamined Patent Application Publication No. 2009-227088 disclose vehicle headlamps that produce shade to prevent glare against front vehicles by detecting the positions of the front vehicles, placing a mask with dimensions corresponding to the vehicles in a position corresponding to the vehicles ahead of a light source, and projecting light from the light source via this mask by means of a projector (image forming device). With these conventional examples, a shape of the mask is configured to be variable, and the part to be shaded is controlled on a variable basis according to the shape of that mask. Front vehicles are detected by performing an image recognition process using images captured by a camera mounted on a subject vehicle (see, for example, Japanese Unexamined Patent Application Publication No. 2009-298344). In this way, by controlling radiation pattern of high beams adequately, it is possible to prevent glare against front vehicles while radiating light in other areas, so that it is possible to contribute, for example, to find pedestrians early and to improve long-distance visibility.

Now, with the above-described conventional examples, normally, light from headlamps of oncoming vehicles and tail lamps of leading vehicles is extracted from image(s) captured by a camera, and positions of the vehicles are detected based on extracted light. Given this situation, for example, when a front vehicle approaches a curved road, or when a front vehicle changes a lane on a straight road, and a relative positional relationship between the front vehicle and the subject vehicle changes, it takes some time to detect the positional relationship after the change, generate a light distribution control signal, and change the radiation pattern of high beam based on the light distribution control signal. Such time lag may cause an inconvenience that high beam is temporarily caught in a side minor of the front vehicle and cause a glare to the front vehicle for a while.

SUMMARY OF THE INVENTION

One object of a specific mode of the present invention is to provide a technology to avoid glaring a front vehicle.

A lighting control device for a headlamp of a vehicle according to an aspect of the present invention comprises: (a) a light-blocking range setting unit that sets a light-blocking range in accordance with a position of a target vehicle that is present ahead of the vehicle, based on an image acquired by capturing front of the vehicle by a camera; (b) a moving direction detection unit that detects a moving direction of the target vehicle in a horizontal direction based on the image; (c) a light-blocking range correction unit that corrects the light-blocking range based on the moving direction detected by the moving direction detection unit; and (d) a headlamp control unit that drives the headlamp based on the light-blocking range corrected by the light-blocking range correction unit.

Preferably, the light-blocking range correction unit corrects the light-blocking range so that at least a moving direction side of the light-blocking range is expanded. Preferably, the light-blocking range correction unit further corrects the light-blocking range to narrow an opposite side of the light-blocking range in the moving direction.

Generally, once a vehicle changes lanes and starts moving in a specific direction, in most cases, the vehicle keeps on moving in that direction, and does not move in opposite directions soon. Also, when a target vehicle (a front vehicle) is moving on a curved road, in most cases, the movement of the target vehicle in the horizontal direction as seen from the subject vehicle continues in a specific direction. Therefore, by detecting the moving direction (right direction or left direction) of the target vehicle in the horizontal direction, and correcting the light-blocking range of the headlamp of the subject vehicle based on the detection result in advance, it is possible to avoid glaring the front vehicle even when the relative positional relationship between the subject vehicle and the front vehicle changes.

Preferably, the lighting control device described above further comprises a moving speed detection unit that detects a moving speed of the target vehicle in the horizontal direction based on captured images, wherein the light-blocking range correction unit increases and decreases an amount of correction in accordance with the moving speed detected by the moving speed detection unit.

By this means, the amount of correction to be assigned to the light-blocking range can be made greater as the moving speed of the target vehicle in the horizontal direction increases, so that it is possible to correct the light-blocking range more adequately.

Preferably, in the lighting control device described above, the light-blocking range correction unit further increases and decreases the amount of correction in accordance with a speed of the subject vehicle.

The positional relationship between the subject vehicle and the target vehicle varies greater over time depending on the speed of the vehicles, so that the light-blocking range can be corrected more adequately by increasing and decreasing the amount of correction depending on the vehicle speed of the subject vehicle.

A headlamp system for a vehicle according to an aspect of the present invention comprises: the lighting control device for the headlamp of the vehicle described above; and the headlamp of the vehicle that is controlled by the lighting control device.

By this means, it is possible to provide a vehicle headlamp system which can avoid glaring the front vehicle even when the relative positional relationship between the subject vehicle and the front vehicle changes.

BRIEF DESCRIPTION OF THE DRAWINGS

FIGS. 4A to 4C are conceptual diagrams for explaining light distribution pattern control;

FIGS. 7A to 7C are diagrams for explaining an amount of correction; and

FIGS. 8A to 8C are diagrams for explaining a vehicle speed coefficient.

DESCRIPTION OF THE PREFERRED EMBODIMENTS

Now, an embodiment of the present invention will be described below with reference to the accompanying drawings.

Figure 1:
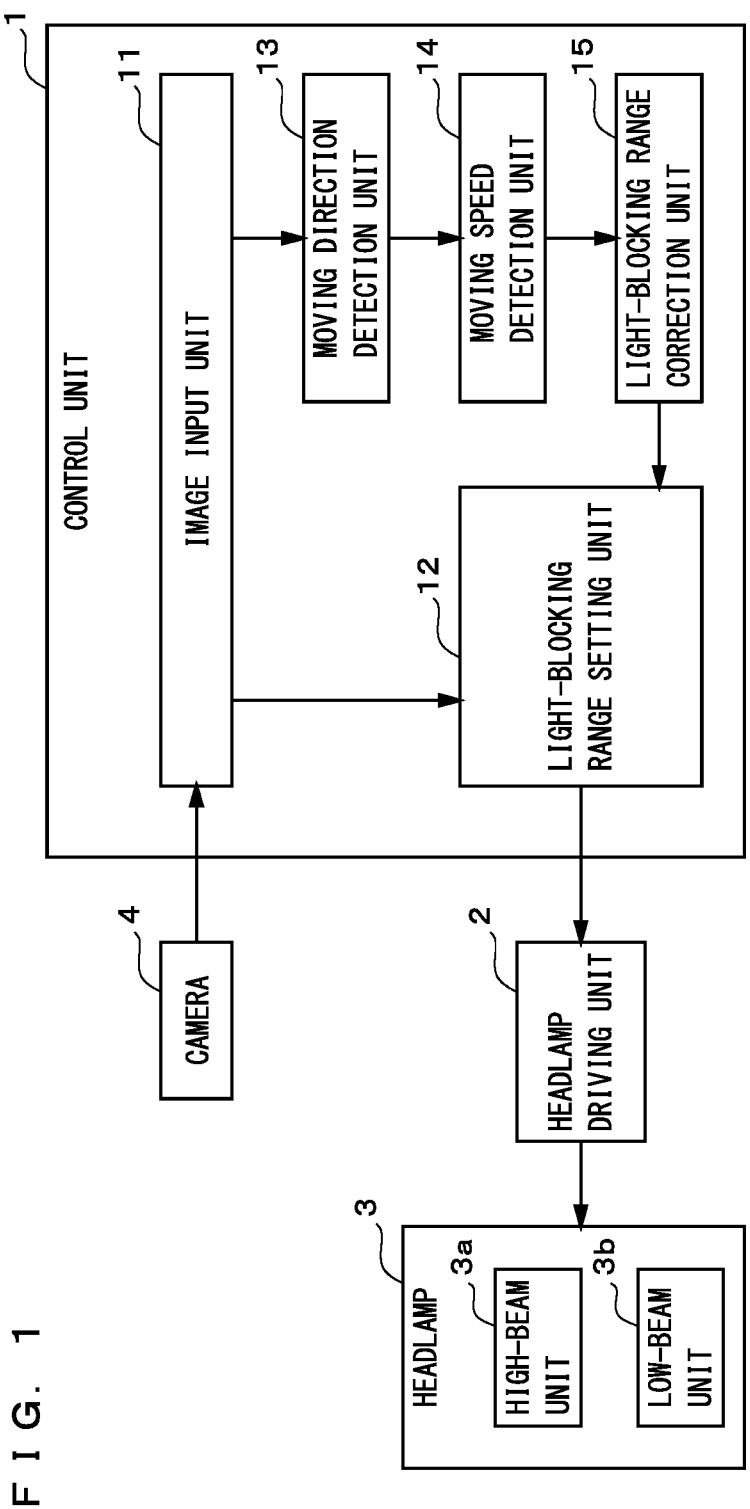
FIG. 1 is a block diagram illustrating a configuration of a vehicle headlamp system according to an embodiment.

FIG. 1 is a block diagram illustrating a configuration of a vehicle headlamp system according to an embodiment. The vehicle headlamp system illustrated in FIG. 1 sets a light distribution pattern based on images acquired by capturing the front view from a subject vehicle by a camera 4 mounted on the subject vehicle to radiate light. The vehicle headlamp system is configured to include a lighting control device that has a control unit 1 and a headlamp driving unit 2, and a headlamp 3 that is applied a lighting control by the lighting control device. Note that the camera 4 may be part of the vehicle headlamp system.

The control unit 1 has an image input unit 11, a light-blocking range setting unit 12, a moving direction detection unit 13, a moving speed detection unit 14, and a light-blocking range correction unit 15. This control unit 1 is implemented by, for example, executing a predetermined operation program on a computer system having a CPU, a ROM, a RAM and so on.

The image input unit 11 acquires images (image data) from the camera 4 at predetermined timings. Note that, in cases where an image is received as input from the camera 4 by an analog signal, the image input unit 11 also performs a process of converting that analog signal into a digital signal.

The light-blocking range setting unit 12 performs an image recognition process based on the images acquired by capturing the front of the subject vehicle by the camera 4, to detect a target vehicle (front vehicle) that is present ahead of the subject vehicle, and sets a light-blocking range in accordance with the position of that target vehicle. The target vehicle here refers to a leading vehicle or an oncoming vehicle.

The moving direction detection unit 13 detects a moving direction of the target vehicle in a horizontal direction by performing the image recognition process based on the images acquired by capturing the front of the subject vehicle by the camera 4.

The moving speed detection unit 14 detects a moving speed of the target vehicle in the horizontal direction by performing the image recognition process based on the images acquired by capturing the front of the subject vehicle by the camera 4.

The light-blocking range correction unit 15 assigns an amount of correction to the light-blocking range that is set by the light-blocking range setting unit 12, based on the moving direction of the target vehicle detected by the moving direction detection unit 13. Briefly speaking, the light-blocking range correction unit 15 assigns the amount of correction to expand the right side of the light-blocking range and to narrow the left side, when the moving direction is the right direction, and on the other hand, assigns the amount of correction to expand the left side of the light-blocking range and to narrow the right side, when the moving direction is the left direction. The amounts of correction are then increased or decreased taking into account the moving speed of the target vehicle detected by the moving speed detection unit 14 and the vehicle speed of the subject vehicle. The details will be described later.

The headlamp driving unit 2 drives the headlamp 3 such that an area specified by the light-blocking range corrected by the light-blocking range correction unit 15 is shaded and other areas are illuminated by light.

The headlamp 3 has a high beam unit 3a for generating a high beam and a low beam unit 3b for generating a low beam. The headlamp 3 radiates light based on driving signals supplied from the headlamp driving unit 2. In the headlamp 3 of the present embodiment, the low beam unit 3b may radiate light to a fixed area, and the high beam unit 3a may radiate light selectively according to the light-blocking range.

Figure 2:
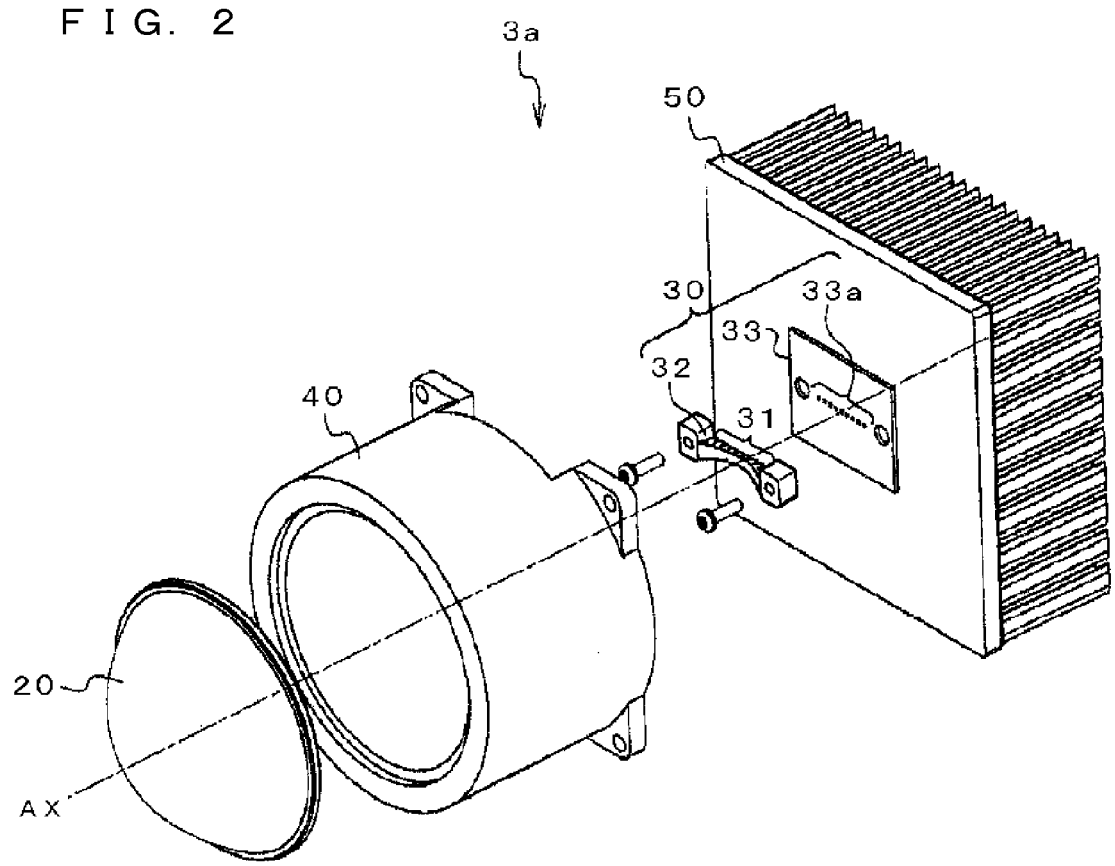
FIG. 2 is a perspective view illustrating a configuration example of a headlamp.

FIG. 2 is an exploded perspective view illustrating a configuration example of the high beam unit 3a of the headlamp 3. The high beam unit 3a of the configuration example illustrated in FIG. 2 is configured to include a projection lens 20 that is placed on an optical axis AX, which extends in a front-back direction of the vehicle, a light source unit 30 that is placed in the rear of the rear focal plane of the projection lens 20, a lens holding frame 40 that holds the projection lens 20 in a predetermined position, and a heat sink 50 that is attached to the light source unit 30. With this high beam unit 3a, the projection lens 20 is attached to the lens holding frame 40, and this lens holding frame 40 is screwed and fixed to the heat sink 50, whereby the high beam unit 3a is integrated. The light source unit 30 has a light guide lens body 32 that is formed by integrating a plurality of light guiding lens units 31, and a light-emitting element substrate 33 that has a plurality of light-emitting elements 33a aligned in one direction (horizontal direction), and is placed in the rear of the light guide lens body 32. The light-emitting elements 33a are, for example, white LEDs of the same configuration, other light-emitting diodes, laser diodes and so on. Light radiated from the light-emitting elements 33a is guided by the light guide lens body 32 to the projection lens 20, and is projected ahead of the subject vehicle. Then, by controlling each light-emitting element 33a on and off separately, the light distribution pattern can be controlled flexibly. For example, radiation area by the high beam is partially blocked. A specific example of the light distribution pattern will be described later.

The vehicle headlamp system according to the present embodiment is configured as described above, and, next, operations of the vehicle headlamp system will be described in detail.

Figure 3A:
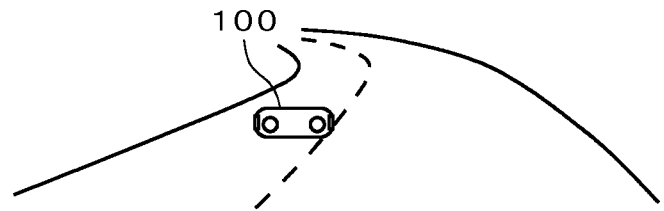
FIGS. 3A to 3C are conceptual diagrams for explaining light distribution pattern control.
Figure 3B:
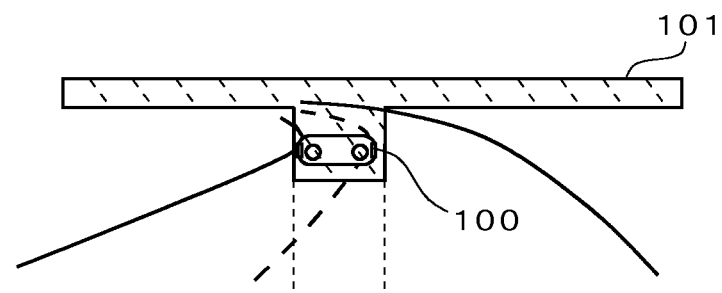
Figure 3C:
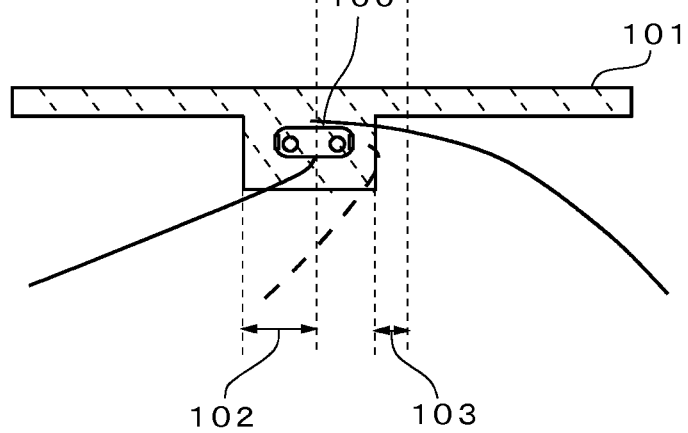

FIGS. 3A to 3C are conceptual diagrams for explaining a control of light distribution pattern by the vehicle headlamp system in cases where the leading vehicle, which is the target vehicle that is present ahead of the subject vehicle, approaches a curved road. FIG. 3A to FIG. 3C schematically illustrate the situations of the road seen from the subject vehicle, and light distribution patterns corresponding to the situations. For example, assume a case where, as illustrated in FIG. 3A, there is a curved road ahead of the subject vehicle and its curving direction is the left direction, and the target vehicle (leading vehicle) 100 approaches there. In this case, the apparent position of the target vehicle 100 gradually moves to the left. Then, as illustrated in FIG. 3B, a light-blocking range 101, which shades a predetermined range based on the position of the target vehicle 100, would be set by the light-blocking range setting unit 12. However, in this situation, the resetting of the light-blocking range 101 may not be made in time due to movement of the target vehicle 100 in the horizontal direction, and the high beams from the subject vehicle may be caught in the left side mirror of the target vehicle 100, and thus it causes a glare to the target vehicle 100. Thus, in accordance with the moving direction (in this case, the left direction) of the target vehicle 100 detected by the moving direction detection unit 13, the light-blocking range correction unit 15 assigns a certain amount of correction 102 to expand the left side of the light-blocking range 100, as illustrated in FIG. 3C, and also assigns a certain amount of correction 103 to narrow the right side of the light-blocking range 100. In this way, by detecting the moving direction of the target vehicle 100 and expanding the width of the light-blocking range 101 in a corresponding direction in advance, it is possible to avoid glaring the target vehicle 100. Also, by narrowing the light-blocking range 101 in the opposite direction of the moving direction of the target vehicle 100, it is possible to avoid making the light-blocking range 101 unnecessarily large. Note that the same applies to the case where the curving direction of a curved road ahead of the subject vehicle is the right direction.

FIGS. 4A to 4C are conceptual diagrams for explaining a control of light distribution pattern by the vehicle headlamp system in cases where the leading vehicle changes the course, the leading vehicle being the target vehicle that is present ahead of the subject vehicle. FIG. 4A to FIG. 4C schematically illustrate the situations of the road seen from the subject vehicle, and light distribution patterns corresponding to the situations. For example, assume a case where, as illustrated in FIG. 4A, there is a target vehicle (leading vehicle) 100 ahead of the subject vehicle driving on a straight road, and where this target vehicle 100 changes course to the right as illustrated in FIG. 4B. In this case, the apparent position (position relative to the subject vehicle) of the target vehicle 100 gradually moves to the right. In this situation, as illustrated in FIG. 4B, the light-blocking range 101, which shades a certain range in accordance with the position of the target vehicle 100, is set by the light-blocking range setting unit 12. However, in this situation, the resetting of the light-blocking range 101 may not be made in time due to movement of the target vehicle 100 in the horizontal direction, and the high beams from the subject vehicle may be caught in the right side mirror of the target vehicle 100, and thus it causes a glare to the target vehicle 100. Thus, in accordance with the moving direction (in this case, the right direction) of the target vehicle 100 detected by the moving direction detection unit 13, the light-blocking range correction unit 15 assigns a certain amount of correction 102 to expand the right side of the light-blocking range 100, as illustrated in FIG. 4C, and also assigns a certain amount of correction 103 to narrow the left side of the light-blocking range 100. In this way, by detecting the moving direction of the target vehicle 100 and expanding the width of the light-blocking range 101 in a corresponding direction in advance, it is possible to avoid glaring the target vehicle 100. Also, by narrowing the light-blocking range 101 in the opposite direction of the moving direction of the target vehicle 100, it is possible to avoid making the light-blocking range 101 unnecessarily large. Note that the same can apply to the case where the direction in which the target vehicle 100 changes course is the left direction.

Figure 5:
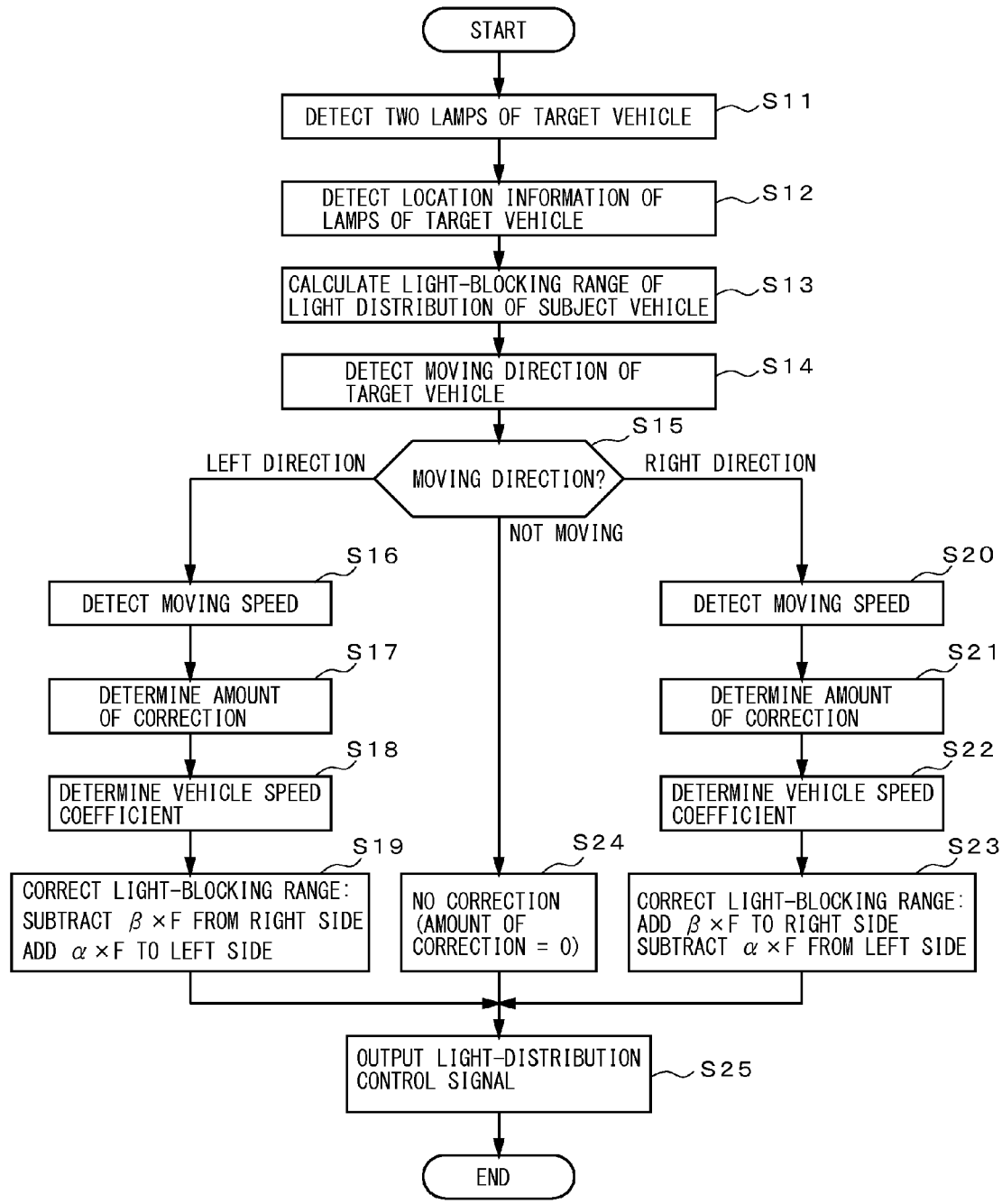
FIG. 5 is a flowchart illustrating content of control of a vehicle headlamp system.

Next, a process of control for implementing a light distribution control as described above will be described based on a flowchart illustrated in FIG. 5.

The light-blocking range setting unit 12 detects the target vehicle (step S11) by performing the image recognition process based on the image captured by the camera 4 and received as input in the image input unit 11, and acquires lamp position information of the target vehicle (step S12). The lamps here refer to tail lamp(s) if the target vehicle is a leading vehicle, or refers to headlamp(s) if the target vehicle is an oncoming vehicle.

The light-blocking range setting unit 12 calculates the light-blocking range in the light distribution pattern of the subject vehicle based on the lamp position information of the target vehicle (step S13). To be more specific, as illustrated in FIGS. 3A to 3C which are referred to above, the light-blocking range is set so that the range extends to both sides from the center of the lamps. Note that, although in each of the examples illustrated in FIGS. 3A to 3C and FIGS. 4A to 4C, the light-blocking range is set over the entirety above the target vehicle 100, it is not limited to such manner.

The moving direction detection unit 13 detects the moving direction of the target vehicle (step S14) by performing the image recognition process based on the images captured by the camera 4 and received as input in the image input unit 11. The moving direction detection unit 13 determines the moving direction of the target vehicle (step S15).

Figure 6:
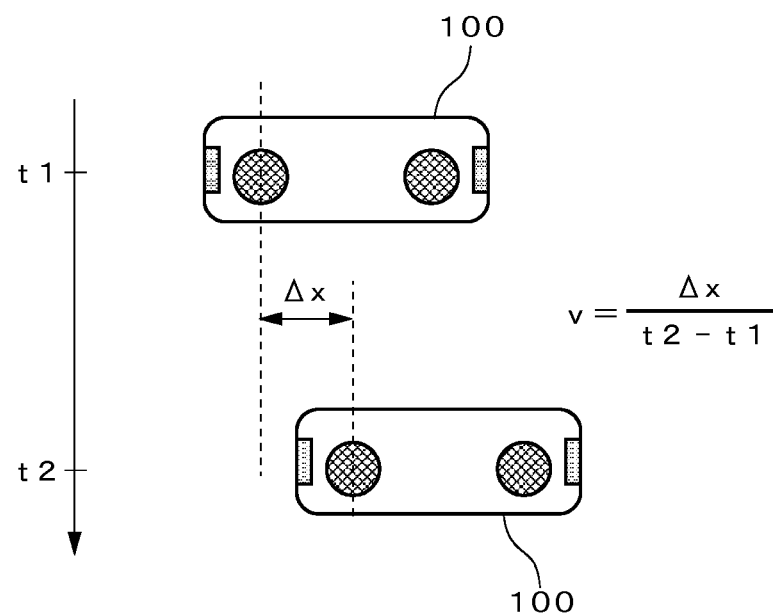
FIG. 6 is a diagram for explaining principle of detecting moving speed of a target vehicle in a horizontal direction.

To be more specific, for example as illustrated in FIG. 6, the moving direction detection unit 13 detects the position of the target vehicle (the left and right lamp positions) at given time t1 and the position of the target vehicle at later time t2, and extracts the moving distance Δx between the positions in the horizontal direction. If the value of Δx is 0 (or equal to or lower than a predetermined value), it is possible to determine that the target vehicle is not moving, and, if the absolute value of the value of Δx is greater than 0 (or a predetermined value), it is possible to determine that the target vehicle is moving. Also, with reference to the position of the target vehicle at time t1 as the origin, it is possible to determine the moving direction based on whether the value of Δx is positive or negative. Note that, in this context, the moving represents a move relative to the subject vehicle, especially a move relative to the subject vehicle in the horizontal (left and right) direction.

In cases where the moving direction is the left direction, the moving speed detection unit 14 detects the moving speed of the target vehicle (step S16). To be more specific, as illustrated in FIG. 6 which is referred to above, it is possible to calculate the moving speed v of the target vehicle by dividing Δx by time (t2-t1).

Next, the light-blocking range correction unit 15 determines the amounts of correction α and β for correcting the light-blocking range according to the moving speed detected by the moving speed detection unit 14 (step S17). The amounts of correction are set greater if the moving speed is faster. Also, the light-blocking range correction unit 16 determines the vehicle speed coefficient F for correcting the amounts of correction depending on the vehicle speed of the subject vehicle (step S18). This vehicle speed coefficient is set greater if the vehicle speed is faster.

After that, the light-blocking range correction unit 15 corrects the light-blocking range using the amounts of correction α×F and β×F, which are given by multiplying the amounts of correction by the vehicle speed coefficient F (step S19). To be more specific, given the light-blocking range set by the light-blocking range setting unit 12, the light-blocking range correction unit 15 adds the amount of correction α×F to the left side of the light-blocking range, and subtracts the amount of correction β×F to the right side of the light-blocking range (see, for example, FIGS. 3A to 3C and FIGS. 4A to 4C).

Likewise, in cases where the moving direction is the right direction, the moving speed detection unit 14 detects the moving speed of the target vehicle (step S20). Next, the light-blocking range correction unit 15 determines the amounts of correction α and β for correcting the light-blocking range depending on the moving speed detected by the moving speed detection unit 14 (step S21). The light-blocking range correction unit 16 determines the vehicle speed coefficient F for increasing and decreasing the amounts of correction depending on the vehicle speed of the subject vehicle (step S22).

After that, the light-blocking range correction unit 16 corrects the light-blocking range using the amounts of correction α×F and β×F, which are given by multiplying the amounts of correction by the vehicle speed coefficient (step S23). To be more specific, given the light-blocking range set by the light-blocking range setting unit 12, the light-blocking range correction unit 16 adds the amount of correction α×F to the right side of the light-blocking range, and subtracts the amount of correction β×F to the left side of the light-blocking range (see, for example, FIGS. 3A to 3C and FIGS. 4A to 4C).

Note that, in cases where the target vehicle does not move, the light-blocking range correction unit 16 does not correct the light-blocking range, that is to say, sets the amounts of correction to 0 (step S24).

When the light-blocking range that is adequately corrected in this way is output from the light-blocking range setting unit 12, a light distribution control signal for driving the headlamp 3 in a light distribution pattern in accordance with the light-blocking range is output from the headlamp driving unit 2 to the headlamp 3 (step S25). Based on this light distribution control signal, the light-emitting elements 33a, provided in the high beam unit 3a of the headlamp 3, are selectively lighted on, whereby light is radiated ahead of the subject vehicle in the light distribution pattern with a desired light-blocking range.

Now, the method of determining the amounts of correction in the light-blocking range correction unit 15 will be described with reference to FIGS. 7A to 7C and FIGS. 8A to 8C. The amounts of correction to be assigned depending on the moving direction of the target vehicle may be fixed values, or, even more preferably, set to be variable depending on the moving speed, as described above. The reason will be described as follows. That is to say, for example, in cases where the curvature of the curved road is small, the moving speed of the target vehicle in the horizontal direction becomes relatively fast, and therefore it is desirable to assign greater amounts of correction to the light-blocking range. On the other hand, in cases where the curvature of the curved road is large, it is desirable to make the amounts of correction smaller. Likewise, even when the target vehicle is driving in a straight road, it is desirable to increase and decrease the amounts of correction depending on the moving speed. The amounts of expanding and reducing the light-blocking range are designed to provide a solution to delay of control, and therefore are preferably set to match the width of the light-blocking range set by the original control, when the apparent movement of the target vehicle in the left and right directions substantially disappears.

For example, based on the moving speed of the target vehicle, it is possible to set the amounts of correction in proportion to the moving speed of the target vehicle in the horizontal direction as illustrated in FIG. 7A. In this case, the relation equation between the moving speed and the amounts of correction may be determined in advance, and the amounts of correction may be determined as appropriate based on that relation equation. Alternatively, such setting is also possible in which, as illustrated in FIG. 7B, the amounts of correction increase stepwise with respect to the moving speed. In this case, for example, as illustrated in FIG. 7C, table data may be prepared in which the relationship between the moving speed and the amounts of correction is defined, and the amounts of correction may be determined as appropriate with reference to this table data. As an example, it is possible to determine the amounts of correction such that, for example, the amounts of correction are 0 when the moving speed is equal to or lower than v1, the amounts of correction are α1 and β1 when the moving speed is greater than v1 and is equal to or lower than v2, the amounts of correction are α2 and β2 when the moving speed is greater than v2 and is equal to or lower than v3, and so on. Using such table data allows a reduction of the amount of calculation.

As described above, the amounts of correction to be set variable according to the moving speed may also preferably be increased or decreased depending on the vehicle speed of the subject vehicle. This is because the positional relationship between the subject vehicle and the target vehicle changes also depending on the relative speed between the subject vehicle and the target vehicle.

Then, the speed of the subject vehicle, which can be more easily detected, may be detected, and, according to this speed, the amounts of correction may be decreased and increased as follows. For example, based on vehicle speed information acquired from the subject vehicle, it is possible to set the vehicle speed coefficient in proportion to the vehicle speed V, as illustrated in FIG. 8A. In this case, the relation equation between the vehicle speed V and the vehicle speed coefficient may be determined in advance, and the amounts of correction may be determined as appropriate based on that relation equation. Alternatively, such setting is also possible in which, as illustrated in FIG. 8B, the vehicle speed coefficient increases stepwise with respect to the vehicle speed V. In this case, for example, as illustrated in FIG. 8C, table data may be prepared in which the relationship between the vehicle speed V and the vehicle speed coefficient is defined, and the amounts of correction may be determined as appropriate with reference to this table data. As an example, it is possible to determine the vehicle speed coefficient such that, for example, the vehicle speed coefficient is 0 when the vehicle speed is equal to or lower than V1, the vehicle speed coefficient is F1 when the vehicle speed is greater than V1 and is equal to or lower than V2, the vehicle speed coefficient is F2 when the vehicle speed is greater than V2 and is equal to or lower than V3, and so on. Using such table data allows a reduction of the amount of calculation.

As described above, according to the present embodiments, the moving direction (right direction or left direction) of the target vehicle in the horizontal direction is detected, and, based on this detection result, the light-blocking range by the headlamps of the subject vehicle is corrected in advance, so that it is possible to avoid glaring a front vehicle even when the relative positional relationship between the subject vehicle and the front vehicle changes.

Moreover, according to the present embodiments, the amounts of correction are increased and decreased according to the moving speed of the target vehicle in the horizontal direction, so that it is possible to set the light-blocking range even more adequately.

Furthermore, according to the present embodiments, the amounts of correction are increased and decreased according to the vehicle speed of the subject vehicle, so that it is possible to correct the light-blocking range even more adequately.

Note that the present invention is not limited to the subject matter of the embodiments described above, and various modifications can be made to the extent without departing from the spirit and the scope of the invention. For example, the structure of headlamps is by no means limited to the example illustrated in FIG. 2.

What is claimed is:

1. A lighting control device for a headlamp of a vehicle, the lighting control device comprising:
 a light-blocking range setting unit that sets a light-blocking range in a light distribution pattern in accordance with a position of a target vehicle that is present ahead of the vehicle, based on an image acquired by capturing a front view from the vehicle by a camera;
 a moving direction detection unit that detects a moving direction of the target vehicle in a horizontal direction based on the image;
 a light-blocking range correction unit that corrects the light-blocking range based on the moving direction detected by the moving direction detection unit, wherein the light-blocking range correction unit corrects the light-blocking range so that at least a moving direction side of the light-blocking range is expanded; and
 a headlamp control unit that drives the headlamp based on the light-blocking range corrected by the light-blocking range correction unit.

2. The lighting control device for the headlamp of the vehicle according to claim 1, wherein the light-blocking range correction unit further corrects the light-blocking range to narrow an opposite side of the light-blocking range in the moving direction.

3. The lighting control device for the headlamp of the vehicle according to claim 1, further comprising a moving speed detection unit that detects a moving speed of the target vehicle in the horizontal direction based on captured images,
 wherein the light-blocking range correction unit increases and decreases an amount of correction in accordance with the moving speed detected by the moving speed detection unit.

4. The lighting control device for the headlamp of the vehicle according to claim 3, wherein the light-blocking range correction unit further increases and decreases the amount of correction in accordance with a speed of the vehicle.

5. A headlamp system for a vehicle, the headlamp system comprising:
 the lighting control device for the headlamp of the vehicle according to claim 1; and
 the headlamp of the vehicle that is controlled by the lighting control device.

* * * * *